March 1, 1966      E. A. MUIJDERMAN ETAL      3,238,000
RADIAL SLIDING BEARING FOR TRAVERSING SHAFTS
Filed Aug. 30, 1963                          2 Sheets-Sheet 1
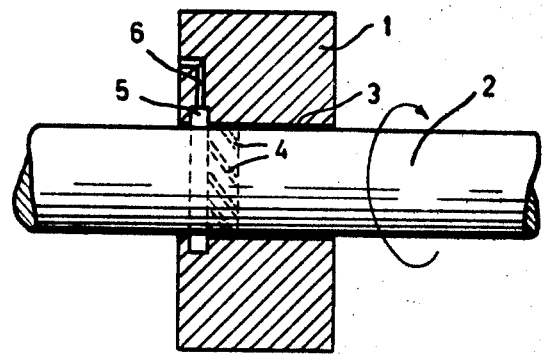
FIG.1
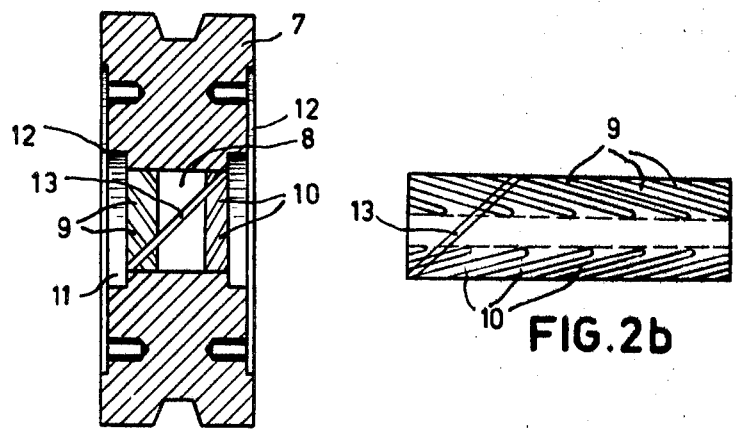
FIG.2a          FIG.2b
INVENTORS
EVERHARDUS A. MUIJDERMAN &
HERRE RINIA
BY
AGENT March 1, 1966 E. A. MUIJDERMAN ETAL 3,238,000
RADIAL SLIDING BEARING FOR TRAVERSING SHAFTS
Filed Aug. 30, 1963
2 Sheets-Sheet 2

INVENTORS
EVERHARDUS A. MUIJDERMAN &
HERRE RINIA
BY
AGENT

United States Patent Office 3,238,000
Patented Mar. 1, 1966

3,238,000
RADIAL SLIDING BEARING FOR TRAVERSING SHAFTS
Everhardus Albertus Muijderman and Herre Rinia, Emmasingel, Eindhoven, Netherlands, assignors to North American Philips Company, Inc., New York, N.Y., a corporation of Delaware
Filed Aug. 30, 1963, Ser. No. 305,637
Claims priority, application Netherlands, Sept. 6, 1962, 282,966
4 Claims. (Cl. 308—121)

The invention relates to a radial sliding bearing for a traversing shaft, in which a lubricant is provided between the co-operating surfaces of the bearing and the shaft. Bearings of this type have been known already for a long time and work well subject to sufficient lubricant being available between the co-operating surfaces. However, in case of hydrodynamic lubrication, leakage will occur at the extermities of the bearing as a result of the pressure in the lubricant, so that after a shorter or longer period of time no lubricant will be available any more in the bearing. It is known to hold a certain quantity of lubricant in the gap of the bearing, for example, by means of sealing rings of felt or of bearings consisting of porous bronze. It has appeared, however, that these means are insufficient and that the bearing jams after a compartively short period of time if no lubricant is supplied.

The object of the invention is to provide a bearing which is capable of prolonged operation under complete film lubrication. For this purpose, according to the invention, the co-operating surfaces of the bearing and the shaft are constructed smooth through part of their length, while at least on one side of this smooth part, one of the co-operating surfaces of the bearing or the shaft is provided with at least one helical groove, the diameter of the crests of which is substantially equal to the diameter of the smooth part of that surface. The groove or grooves pump the lubricant in the direction of the co-operating smooth surfaces, as a result of which always sufficient supply of lubricant is obtained to realize a hydrodynamic lubrication. There is no restriction as to the choice of the lubricant. Usually, the choice will be oil or grease, but also, for example, water, graphite and the like are suitable lubricants.

The radial sliding bearing according to the invention can be made suitable to operate without re-lubrication so that practically not care need be paid to maintenance. For this purpose, according to the invention, means are available for returning the medium which has passed through at least part of the co-operating smooth surfaces to the groove or grooves. A circulation of lubricant through the bearing is obtained, so that only a restricted quantity of lubricant is sufficient while always hydrodynamic lubrication will occur.

One of the co-operating surfaces of the bearing and the shaft may be provided on both sides of the smooth part with equal grooves having an opposite pitch. The lubricant will then be urged through the two grooves towards the smooth part. However, it has appeared to be very difficult to construct the two grooves equal so that they both have an exactly equal urging action. In a favourable embodiment according to the invention, one of the co-operating surfaces on both sides of the smooth part is provided with one or more helical grooves, which have opposite pitches which are constructed so that the urging force of one of the grooves is larger than the urging force of the other grooves, white on one of the surfaces in addition a further groove is available which is provided with a pitch which extends through substantially the whole length of the bearing, said latter groove returning lubricant to the groove or grooves with the largest urging force. As a result of the difference in urging force of the two grooves, excessive lubricant will be conducted through the bearing in a direction determined beforehand. The returning groove will be constructed so that the excess is returned to the groove or grooves having the largest urging force, as a result of which a circulation of lubricant is obtained. As as result of this, no leakage of lubricant occurs.

The grooves located on either side of the smooth part may be constructed, for example, with a different pitch or with a different width or depth. Preferably, however, the groove pattern provided on either side of one of the co-operating surfaces is constructed with the same pitch, but with a different length, while the groove returning the medium has a larger pitch and a depth such that as a result of its pumping effect, the excessive lubricant urged to one direction of the bearing is returned to the groove or grooves with the largest length. It appears that this embodiment is particularly suitable for bearings in which grease lubrication is used. In experiments in which the bearing has been in continuous operation for weeks, always hydrodynamic lubrication occurs, although lubricant was provided only at the beginning of the experiment.

In another embodiment according to the invention, one of the co-operating surfaces on either side of the smooth part is provided with one or more helical grooves, which have an opposite pitch, the shaft running in a bearing which is manufactured from a porous material absorbing the lubricant. In this bearing, lubricant is always urged in the direction of the gap of the bearing through the grooves, which lubricant is absorbed by the porous material of the bearing, for example porous bronze. Without the grooves, such a bearing will run dry entirely after some time as a result of the leakage of lubricant at the two extremities. When the shaft rotates, the grooves cause the lubricant, preferably oil, to circulate through the porous material, as a result of which always sufficient lubricant is available in the gap of the bearing.

It is not necessary to provide the grooves on either side of the smooth part of the co-operating surfaces of the bearing and the shaft. According to a favourable embodiment of the bearing according to the invention, one or more grooves are provided on one side of the smooth part of one of the co-operating surfaces, while in the bearing or the shaft at least one channel is provided which extends from the other side of the smooth part to the proximity of the groove or grooves. The groove pumps the lubricant to the gap of the bearing, while the same pumping action also ensures the return of the medium through the channel. In this embodiment, a sealing for preventing leakage or lubricant is provided at the ends of the bearing remote from the grooves. This sealing preferably consists of a helical groove having a small pitch which is opposite to the pitch of the first-mentioned grooves.

In particular in bearings of the construction described so far having a small diameter of the shaft, difficulties occur when obtaining hydrodynamic lubrication. The radial sliding bearing according to the invention, however, also gives good satisfaction if the smooth part of the shaft has a diameter smaller than 1 cm. In experiments on bearings having a diameter of the shaft of 4 mms., full film lubrication occurred after prolonged continuous operation.

The bearings made in accordance with the invention are not complicated in construction and no particular technical requirements are imposed during the manufacture which render the construction expensive. As a result of this, the bearings are also very suitable from an economical point of view for use in apparatus which an be manufactured in series, for example household appliances. According to the invention, grease is preferably used as the lubricant. Also in case of the shaft being at a standstill, no leakage can occur.

In order that the invention may readily be carried into effect, a few embodiments thereof will now be described more fully, by way of example, with reference to the accompanying drawings, in which FIG. 1 shows a bearing which is provided with helical grooves on one side, FIG. 2a is a bearing which is provided on either side with helical grooves and further with a groove for returning the lubricant;

FIG. 2b is a developed view of the surface of the bearing with grooves provided in it;

Figure 3:
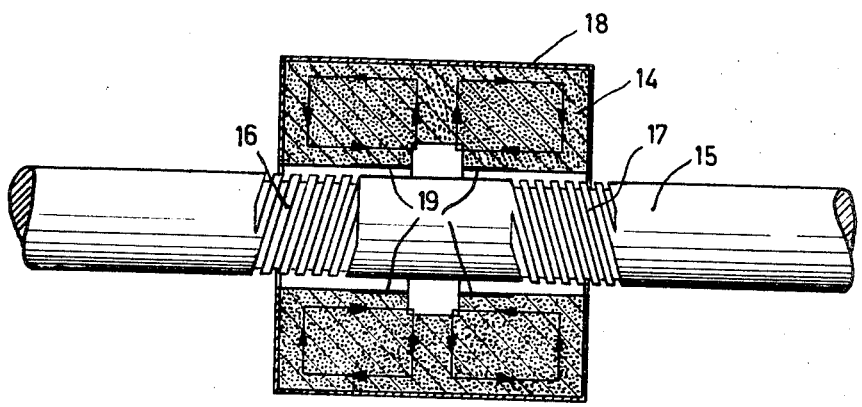
FIG. 3 shows a bearing of porous material with a shaft which is provided on either side with helical grooves.

In FIG. 1, the bearing is designated 1 and the traversing or movable shaft 2. The bearing surface is provided with a smooth part 3 which co-operates with the smooth shaft. In addition, on one side in the bearing helical grooves 4 are provided, the crests of which have substantially the same diameter as the smooth part of the bearing. The bearing comprises a chamber 5 to which lubricant is supplied through a channel 6.

If the shaft 2 rotates in the direction shown, the grooves 4 urge lubricant in the direction of the co-operating smooth parts of the bearing and the shaft. There is always a sufficient quantity of lubricant between the co-operating surfaces, as a result of which a complete lubricating film is maintained between the bearing and the shaft. The grooves need have only a very small depth and may be etched in the bearing, for example. With an equally favourable effect as far as the film lubrication is concerned, the grooves may alternatively be provided in the shaft. In this latter construction, however, the shaft must be adjusted rather accurately in an axial direction with respect to the bearing.

In order to obtain a bearing in which no leakage losses occur, a helical groove or grooves may be provided with an opposite pitch on either side of the co-operating smooth surfaces of the bearing and the shaft, which grooves urge an equally large quantity of lubricant in the direction of the co-operating smooth surfaces. The lubricant which in case of hydrodynamic lubrication is under a high pressure, in particular in the central part of the co-operating surfaces, will try to leak away as a result of this pressure at the ends of the bearing. The grooves return this lubricant, so that leakage is prevented. However, it is difficult technically to realize these entirely equally-operating grooves. One set of the grooves will in practice often have a larger urging effect, as a result of which leakage occurs on one side of the bearing. According to the invention, the two sets of grooves may be constructed so that they have a different urging effect in a direction determined beforehand, the excessive lubricant which flows to the groove with the smallest urging effect being returned to the grooves with the largest urging effect.

FIG. 2a shows such a bearing which needs no re-lubrication, since the lubricant circulates through the bearing and in which no leakage losses occur. For reasons of clarity, the shaft is not shown. A bearing block 7 has a cylindrical bore, the central part 8 of which is constructed smooth. Helical grooves 9 and 10 having an equally large but opposite pitch are provided on either side of the smooth part 8. The length of the grooves 9 is larger than that of the grooves 10. At the beginning of each of the grooves, a supply chamber 11 for the lubricant is provided. In recesses 12, a locking ring (not shown) may be provided through which the shaft extends. The bearing surface is further provided with a groove 13, the pitch of which is larger than that of the grooves 9 and 10 and which also has a greater depth. FIG. 2b shows a developed view of the grooves in the bearing surface.

If the shaft (or the bearing) rotates, the lubricant in the storage chamber is urged through the grooves 9 and 10 into the direction of the smooth surface 8, as a result of which always sufficient lubricant is available in the gap of the bearing to guarantee a hydrodynamic lubrication. The grooves 9 urge a larger quantity of lubricant to the smooth part 8 than the grooves 10, since their length is larger. The difference in the quantity of lubricant transported through the two sets of grooves will now be urged into the direction of the grooves 10. This excessive lubricant is returned through the groove 13 to the supply chamber 11. In this manner, a circulation is obtained of lubricant through the bearing, re-lubrication of the bearing is not necessary and leakage does not occur.

The type of bearing shown in FIG. 2a is highly suitable for use in shafts having a small diameter, for example smaller than 1 cm. In experiments in which a shaft with a diameter of 4 mms. was used and grease was used as the lubricant, the shaft rotated continuously for weeks. Always a complete lubricant film was available in the gap of the bearing, although the bearing was lubricated only as the beginning of the experiment. The depth of the grooves 9 and 10 was approximately 50 microns, the depth of the groove 13 was approximately 0.15 mm. The bearing shown in FIG. 2a is particularly suitable for use in household appliances. When using grease as a lubricant, no leakage will occur during idleness either. The problem of obtaining a bearing, in particular for a shaft with a small diameter, which operates without re-lubrication and without leakage always under hydrodynamic lubrication is solved in a technically simply and economically acceptable manner with a construction shown in FIG. 2a which could not be reached with any of the bearings heretofore known.

Obtaining a previously determined excess of lubricant may be realized by using equal grooves with different lengths, but this may also be realized in other ways. For example, the width or the depth of one set of grooves may be chosen to be larger than that of the other set; alternatively, the pitch of one set of grooves may be larger than the pitch of the other set. The shape of the returning groove 13 may be calculated in a simple manner. In this case also, the pitch, the width and the depth of the groove is a measure of the returned quantity of lubricant. While maintaining the same hydrodynamic action, the grooves may also be provided in the shaft or grooves may be provided in the shaft and other grooves in the surface of the bearing. When providing grooves in the shaft, the shaft must be adjusted axially with respect to the bearing, which is not necessary with grooves in the bearing.

FIG. 3 shows an embodiment which is particularly suitable for oil as a lubricant. The bearing 14 is manufactured from porous material, for example, bronze balls which are somewhat melted together. The shaft 15 is provided with two sets of equal helical grooves 16 and 17 having opposite pitches. Around the bearing, a sealing cap 18 is provided. The part 19 of the bearing opposite the smooth part of the shaft 19 preferably has no porous surface.

When the shaft rotates, the helical grooves 19 will urge oil, which tries to leak out of the bearing along the shaft as a result of the pressure occurring in hydrodynamic lubrication, back in the direction of the co-operating smooth surfaces of the bearing and the shaft. In this case, the oil will circulate through the bearing in a direction indicated by the arrows. No leakage of lubricant will occur. The quantity of oil which tries to leak away in case of the bearing being at a standstill is much smaller than the quantity which tries to leak to the outside as a result of the pressure during the rotation. However, when the shaft is stationary, the porous material holds sufficient oil. This bearing consequently needs no re-lubrication and will always operate under conditions of full film lubrication. For reasons of clarity the play between the shaft and the bearing is shown somewhat larger in the drawing than it actually is. Instead of in the shaft, the grooves may also be provided in the bearing.

Figure 4:
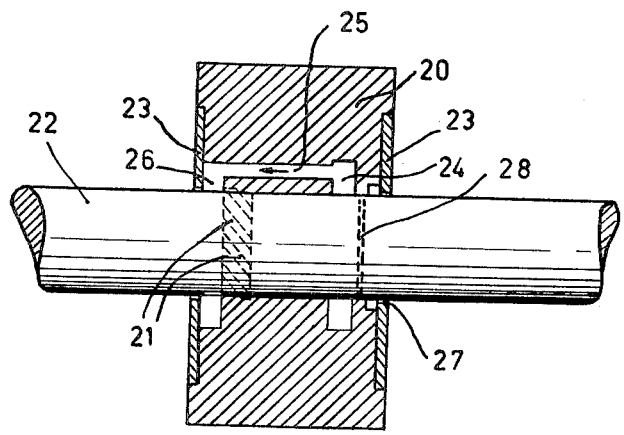
FIG. 4 shows a bearing which is provided on one side with helical grooves and which comprises a channel for returning the lubricant.

FIG. 4 shows a bearing which is provided with only one set of grooves urging the lubricant. The bearing 20 has a smooth surface in which helical grooves 21 are provided on one side. The traversing shaft 22 is constructed entirely smooth. In the bearing, sealing rings 23 are provided which have a small play with respect to the shaft 22. In the bearing, an annular space 24 is provided which is connected through one or more channels 25 to an annular supply chamber 26 for the lubricant.

When the shaft rotates, the lubricant in the supply chamber 26 is urged in the direction of the co-operating smooth surfaces of the bearing and the shaft, in the drawing to the right. The lubricant is conducted again to the supply chamber 26 through the channel 25. So, the lubricant always circulates through the bearing. From the supply chamber the lubricant is again absorbed by the grooves and is not under such a pressure that leakage occurs on that side of the bearing. On the righthand side, an annular recess 27 is provided in which a sealing may be arranged. Since the lubricant is returned through the channel 25, leakage will already be prevented in case of a simple sealing. Preferably, a groove 28 may be provided in the bearing or in the shaft which need have only a very small depth and a very small pitch opposite to the pitch of the grooves 21. This groove 28 has an urging effect on the lubricant so that no leakage occurs between the bearing and the shaft and a favourable sealing is obtained.

In the bearings according to the invention, the grooves may be provided in the bearing or in the shaft or a few in the bearing and a few in the shaft. Instead of the shaft, it is also possible that the bearing rotates. As a lubricant, grease is sometimes preferred, in particular in bearings having a small diameter which are used, for example, in household appliances. However, also oil, graphite, water and the like cause the bearing constructed in accordance with the invention to have a favourable action.

What is claimed is:

1. A radial sliding bearing for a moving shaft in which a lubricant is provided between the co-acting surfaces of said bearing and shaft comprising at least two spaced helical grooves in said bearing of opposite pitch which are constructed so that the urging force on the lubricant in one of the grooves is larger than the urging force on the lubricant in the other groove, and an additional groove which extends through substantially the whole length of the bearing, said additional groove returning said lubricant to said groove with the largest urging force to thereby recirculate said lubricant.

2. A radial sliding bearing for a moving shaft in which a lubricant is provided between the co-acting surfaces of said bearing and shaft as claimed in claim 1 wherein said two spaced helical grooves are of a different length and the additional groove has a larger pitch and depth than said two spaced helical grooves whereby the lubricant in said additional groove is returned to said helical groove having the longest length.

3. A radial sliding bearing for a moving shaft in which a lubricant is provided between co-acting surfaces of said bearing and shaft comprising one helical groove of a determined pitch in said shaft, another helical groove of a smaller pitch than the pitch of said one helical groove and spaced from the latter, a supply chamber in said bearing adjacent to said one helical groove, an annular space in said bearing adjacent to said other helical groove, a channel connecting said supply chamber to said annular space, said other helical groove providing an urging force on said lubricant whereby when the lubricant is urged from said supply chamber between the smooth surfaces of said bearing and shaft said lubricant is returned to said supply chamber through said channel.

4. A radial sliding bearing for a moving shaft in which a lubricant is provided between the co-acting surfaces of said bearing and shaft comprising at least two spaced helical grooves in said bearing of opposite pitch which are constructed so that the urging force on the lubricant in one of the grooves is larger than the urging force on the lubricant in the other groove, a supply chamber, and a channel connecting at least one of said helical grooves with said supply chamber whereby the lubricant in said groove is returned through said channel to said supply chamber to thereby recirculate said lubricant.

References Cited by the Examiner

UNITED STATES PATENTS

| | | | |
|---|---|---|---|
| 171,359 | 12/1875 | Draper | 308—132 |
| 450,004 | 4/1891 | Daley | 308—98 |
| 2,226,622 | 12/1940 | Lignian | 308—132 |
| 2,479,349 | 8/1949 | Hagg | 308—240 |
| 2,526,594 | 10/1950 | Voysey | 308—36.3 |
| 2,571,672 | 10/1951 | Bradley | 308—132 |
| 3,146,036 | 8/1964 | Benatti | 308—9 |

DON A. WAITE, *Primary Examiner.*

FRANK SUSKO, *Examiner.*